US009194501B2

(12) United States Patent
Cunningham et al.

(10) Patent No.: US 9,194,501 B2
(45) Date of Patent: Nov. 24, 2015

(54) PRESSURE BALANCED SPRING LOADED OVERTRAVEL SEALING APPARATUS

(71) Applicant: Dresser, Inc., Addison, TX (US)

(72) Inventors: Thomas Henry Cunningham, Canton, MA (US); Christopher Edward Wolfe, Niskayuna, NY (US); Nuo Sheng, Schenectady, NY (US); Xuele Qi, Niskayuna, NY (US); Azam Mihir Thatte, Rotterdam, NY (US); James Albert Stares, Norton, MA (US); Henry William Boger, Foxboro, MA (US)

(73) Assignee: Dresser, Inc., Addison, TX (US)

( * ) Notice: Subject to any disclaimer, the term of this patent is extended or adjusted under 35 U.S.C. 154(b) by 407 days.

(21) Appl. No.: 13/681,756

(22) Filed: Nov. 20, 2012

(65) Prior Publication Data
US 2014/0137957 A1    May 22, 2014

(51) Int. Cl.
*F16K 31/12* (2006.01)
*F16K 1/34* (2006.01)
*F16K 39/02* (2006.01)

(52) U.S. Cl.
CPC .............. *F16K 1/34* (2013.01); *F16K 39/022* (2013.01); *F16K 39/024* (2013.01); *Y10T 137/7937* (2015.04)

(58) Field of Classification Search
CPC ............ F16K 39/024; F16K 1/34; E03D 3/04
USPC ............ 251/33, 38, 43, 282; 137/490, 543.19
See application file for complete search history.

(56) References Cited

U.S. PATENT DOCUMENTS

| 1,779,893 | A |   | 10/1930 | Charles |
| 3,076,630 | A | * | 2/1963 | Hammond ................. 251/30.03 |
| 3,211,419 | A |   | 10/1965 | Hubert |
| 3,318,577 | A | * | 5/1967 | Banks .......................... 251/332 |
| 3,624,753 | A |   | 11/1971 | Brumm |
| 4,083,529 | A |   | 4/1978 | Santy et al. |
| 4,351,509 | A | * | 9/1982 | Stampfli ........................ 251/38 |
| 4,978,102 | A |   | 12/1990 | Schuchart et al. |

(Continued)

FOREIGN PATENT DOCUMENTS

| BE | 372724 | A | 8/1930 |
| EP | 0017868 | A1 | 10/1980 |
| EP | 0900962 | A2 | 3/1999 |
| FR | 247589 | A | 6/1926 |
| FR | 2658261 | A | 8/1991 |
| GB | 677132 | A | 8/1952 |
| JP | 6132864 | U | 2/1986 |
| JP | 4206205 | A | 7/1992 |

OTHER PUBLICATIONS

EP Search Report dated Mar. 4, 2014 issued in connection with corresponding EP Application No. 13193356.6.

*Primary Examiner* — John K Fristoe, Jr.
*Assistant Examiner* — Reinaldo Sanchez-Medina
(74) *Attorney, Agent, or Firm* — Paul Frank + Collins P.C.

(57) ABSTRACT

An apparatus includes a cage and a main plug disposed in the cage. The main plug is movable between a main plug closed position and a main plug open position. A seal assembly disposed on the main plug, the seal assembly having a seal that is configured to contact the cage when the main plug is in the main plug closed position, and configured to reduce contact with the cage when a pressure differential across the seal is reduced. The apparatus includes a pressure balancing assembly movable between a closed position, an overtravel position and an open position. The pressure balancing assembly is configured to balance the pressure differential across the seal when in the overtravel and open position.

20 Claims, 11 Drawing Sheets

(56) References Cited

U.S. PATENT DOCUMENTS

| | | |
|---|---|---|
| 5,564,675 A | 10/1996 | Hill, Jr. et al. |
| 6,283,152 B1 | 9/2001 | Corte, Jr. et al. |
| 2002/0017327 A1 | 2/2002 | Kawaai et al. |
| 2002/0162591 A1 | 11/2002 | Baumann |
| 2004/0149950 A1 | 8/2004 | Fitzgerald et al. |
| 2007/0210270 A1 | 9/2007 | Stephenson et al. |
| 2010/0148108 A1 | 6/2010 | Glaun |
| 2010/0270491 A1 | 10/2010 | Faas |
| 2012/0292550 A1 | 11/2012 | Meek |

* cited by examiner

PRESSURE BALANCED SPRING LOADED OVERTRAVEL SEALING APPARATUS

CROSS-REFERENCE TO RELATED APPLICATIONS

This invention is related to U.S. patent application Ser. No. 13/681,795 of Thomas Henry Cunningham, titled APPARATUS AND METHOD FOR REDUCING ACTUATOR THRUST REQUIREMENTS IN A CONTROL VALVE filed concurrently herewith, assigned to the same assignee as the present invention.

TECHNICAL FIELD

The subject matter disclosed herein generally relates to pressure balanced control valves and, more particularly, to pressure balanced control valves with enhanced sealing qualities for use at high temperatures.

BACKGROUND

Control valves are used to control the flow of fluids in systems used in the oil and gas processing, power generation, refining, petrochemical, and water control industries. Conventional control valves typically include a valve body with an inlet and an outlet. A cage and a seat ring are disposed between the inlet and outlet. The cage has at least one port allowing fluid communication between inlet and outlet of the control valve. The term "fluid communication" means allowing fluid to pass between or through, as in fluid passing from one volume to another volume through a conduit. A plug is concentrically disposed in the cage and allowed to axially translate exposing the cage port(s) and modulating the fluid flow. The plug is connected to an actuator by means of a stem. The actuator is a device that supplies force and motion to open or close a valve, and may be powered by mechanical, pneumatic, hydraulic or electrical means.

Some control valves are designed to balance the pressure across the valve plug to reduce the amount of force necessary to open and close the valve with the actuators. Balanced control valves typically include a cage, a plug, a stem, a seat ring, and a balance seal. The plug has at least one conduit or orifice allowing fluid communication between the top and bottom which will balance the pressure across it. A seal ring may be provided between the plug and the cage to minimize fluid leakage. Balanced control valves, typically will have two main possible fluid leakage paths when closed. The first leakage path is between the plug and seat ring, where sufficient actuator force will provide hard metal-to-metal contact to impede flow. This leakage may occur even when the plug is in contact with the valve seat. A second possible leakage path is the seal ring disposed between the plug and cage.

The American National Standards Institute ("ANSI") has established leakage classifications (ANSI/FCI 70-2) for control valves. The standard categorizes seat leakage into six classes (Class I to Class VI). The leakage criteria become more stringent as the class number increases. Class V represents what is commonly referred to as an "effectively zero-leakage" control valve. The standard for Class V valves requires that the maximum leakage allowed through a valve is 0.0005 ml of water per minute, per inch of port diameter, per PSI differential pressure as measured from an inlet port of the valve to an outlet port of the valve.

Balanced valves may be used with a number of different seals disposed between the plug and the cage, such as for example a piston ring seal. Piston ring seals may be manufactured from a variety of materials—such as Teflon, metal, and graphite—depending on the valve application (i.e., type of fluid, temperature, pressure). Teflon piston ring seals, for instance, may allow for a reasonably tight shutoff but be limited in usage by fluid temperature. Graphite and metal piston ring seals may allow for the valve to be used in higher temperature applications, but such materials may not allow for tight shut-off.

A typical piston ring seal may generate considerable friction while in contact with its sealing surface. This friction may be acceptable for applications that allow for leakage higher than the leakage requirements of FCI 70-2 Class V. For example, Class II, Class III or even Class IV, require less contact pressure to meet their respective leakage requirements, but Class V is several orders of magnitude tighter in comparison. To achieve Class V shutoff with a piston ring type sealing member at temperatures above the usable range of elastomers or thermoplastics will typically result in high friction resulting in a high actuation requirement (i.e. a high force is required to open and close the valve) making it difficult to operate the valve.

BRIEF DESCRIPTION OF THE INVENTION

Embodiments of the invention can reduce the friction of the seal at high temperatures thereby reducing the amount of actuation thrust required to throttle the valve.

In one exemplary non-limiting embodiment, an apparatus includes a cage and a main plug disposed in the cage. The main plug is movable between a main plug closed position and a main plug open position. The apparatus includes a seal assembly disposed on the main plug, the seal assembly having a seal that is configured to contact the cage when the main plug is in the main plug closed position, and configured to reduce or eliminate contact with the cage when a pressure differential across the seal is reduced. The apparatus also includes a pressure balancing assembly movable between a closed position, and overtravel position and an open position. The pressure balancing assembly is configured to reduce the friction between the seal and the cage when the pressure balancing assembly is in the overtravel position.

In another embodiment, a method for controlling fluid flow through a valve trim includes sealing an outlet conduit with a main plug disposed in a cage. The main plug is seated against a seat ring coupled with the cage. The method includes applying a force against a seal to close off a space between the main plug and the cage, and to maintain a sealing pressure in the space when the main plug is seated against the seat ring. The method includes balancing the differential pressure across the seal, and unseating the main plug from the seat ring.

In another embodiment, a system for controlling fluid flow through a valve trim includes a cage, a main plug disposed in the cage, and a seat ring configured to engage the main plug. A subsystem is provided to apply a force against a seal to close off a space between the main plug and the cage and maintain a pressure differential across the seal when the main plug is seated against the seat ring. A subsystem that balances the pressure differential across the seal before any movement of the main plug is also provided. The system also includes a subsystem that unseats the main plug from the seat ring.

BRIEF DESCRIPTION OF THE DRAWINGS

Other features and advantages of the present invention will be apparent from the following more detailed description of the preferred embodiment, taken in conjunction with the accompanying drawings which illustrate, by way of example, the principles of certain aspects of the invention.

DETAILED DESCRIPTION OF THE INVENTION

The valve trim according to this disclosure includes a cage, a plug, a seat ring, and a pressure balancing assembly. The valve trim also includes a seal assembly including a seal configured to contact the cage when the main plug is in the closed position. The seal is also configured to reduce or eliminate contact with the cage when the pressure differential across the seal is essentially balanced. The seal is provided with a predetermined resiliency or stiffness associated with the strain energy so that the seal will tend to move away from the cage as the pressure differential acting to force it against the cage decreases. The pressure balancing assembly in combination with the seal assembly provides the required tight shutoff of the seal while the main plug is in the closed position, while reducing or eliminating contact and undesirable friction during main plug throttling (movement of the main plug between a closed and open position) when the tight shutoff is no longer required. The pressure balancing assembly provides relief of the high pressure differential seen when the valve is closed before any relative motion between the cage and the main plug. The main plug and seal assembly provide a radial seal (without steps or reduced diameter surfaces of the plug or cage) and allow for easy field replacement and the possibility of trim upgrades. The valve trim according to this disclosure allows for use of a high temperature metallic material as a radial cylinder seal for tight shutoff while removing undesirable frictional characteristics during throttling and eliminating excessive actuator thrust requirements.

Figure 1:
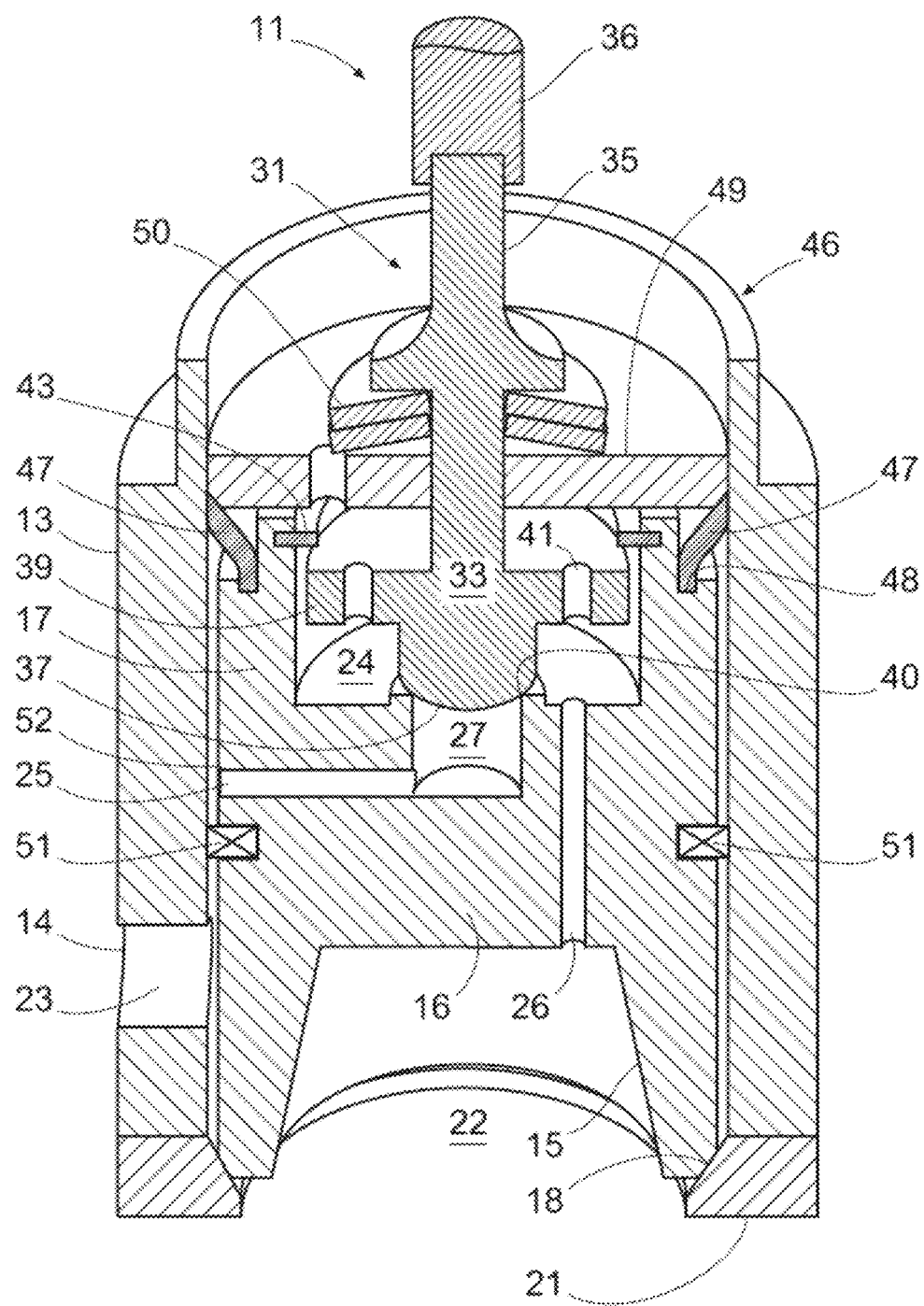
FIG. 1 is a partial cut away view of an embodiment of a valve trim.

FIG. 1 is a partial cut away view of a trim assembly 11 according to one embodiment. The trim assembly 11 includes a cage 13 having a cage port 14. A main plug 15 is disposed inside the cage 13. A seat ring 21 is disposed below the cage 13. The upper portion 17 of the main plug 15 includes a cavity 24. The main plug 15 may also be provided with one or more balancing conduit(s) 25 fluidly coupled to a pilot chamber 27, and a longitudinal conduit 26. A pilot plug 33 is disposed inside the cavity 24 and is connected to a pilot stem 35 and an actuator 36 and is provided with a pilot flange 39. The pilot sealing surface 37 is adapted to engage a pilot seat 40 on the main plug 15. The pilot flange 39 may be provided with one or more axial conduits 41 that are in fluid communication with cavity 24. A retaining ring 43 is coupled to the upper portion 17 of the main plug 15 and is adapted to engage the pilot flange 39 when the pilot plug 33 is raised. Disposed adjacent to the upper portion 17 of the main plug 15 is seal assembly 46 that includes a pressure energized seal (seal 47), a load transfer assembly 49 and resilient member 50. One or more low friction flow restrictor 51 is disposed between the main plug 15 and the cage 13. The interior surface of the cage 13, the exterior surface of the main plug 15, the seal 47 and the low friction flow restrictor 51 define a seal balancing volume 52. Seal balancing volume 52 is in fluid communication with balancing conduit 25 and the pilot chamber 27. The components and their operation are described in more detail below with reference to FIGS. 2-6 which are schematic renderings of the components and operation of another embodiment and their operation.

Figure 2:
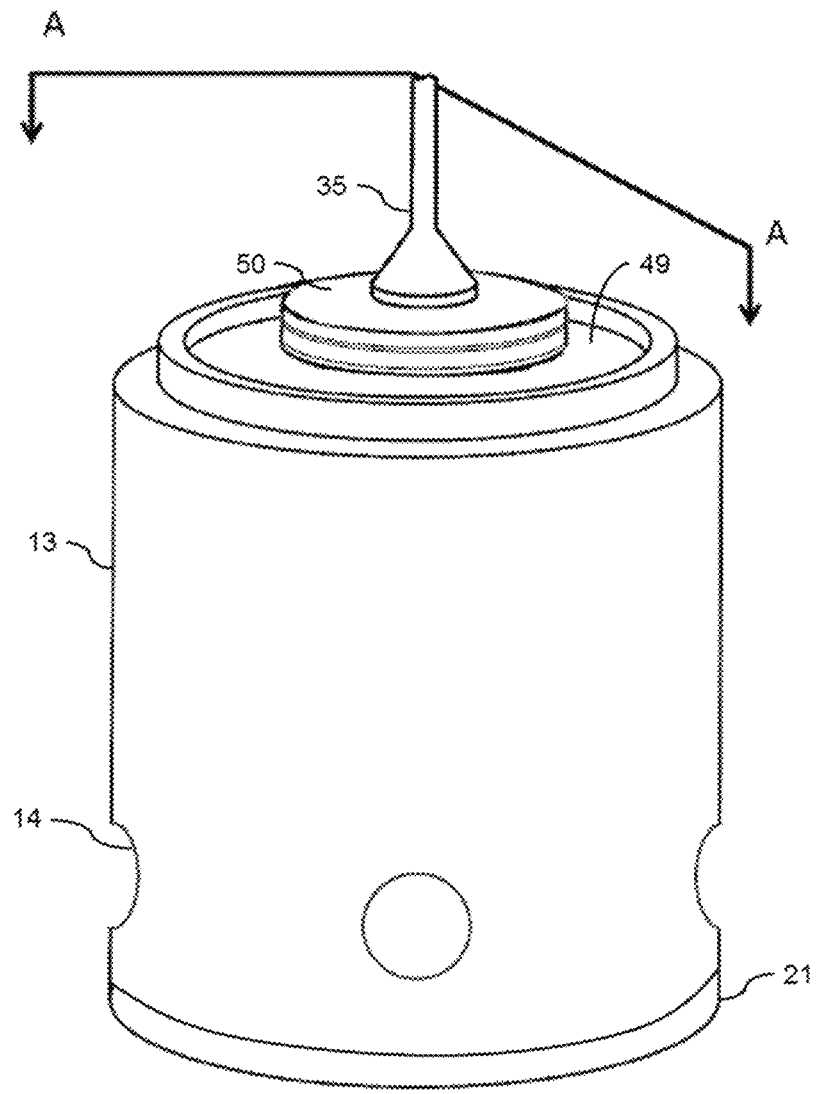
FIG. 2 is a perspective exterior view of an embodiment of a valve trim.

FIG. 2 illustrates a perspective exterior view of a trim assembly 11 according to one embodiment of the present invention. The trim assembly 11 includes a cage 13 having one or more cage port(s) 14.

Figure 3:
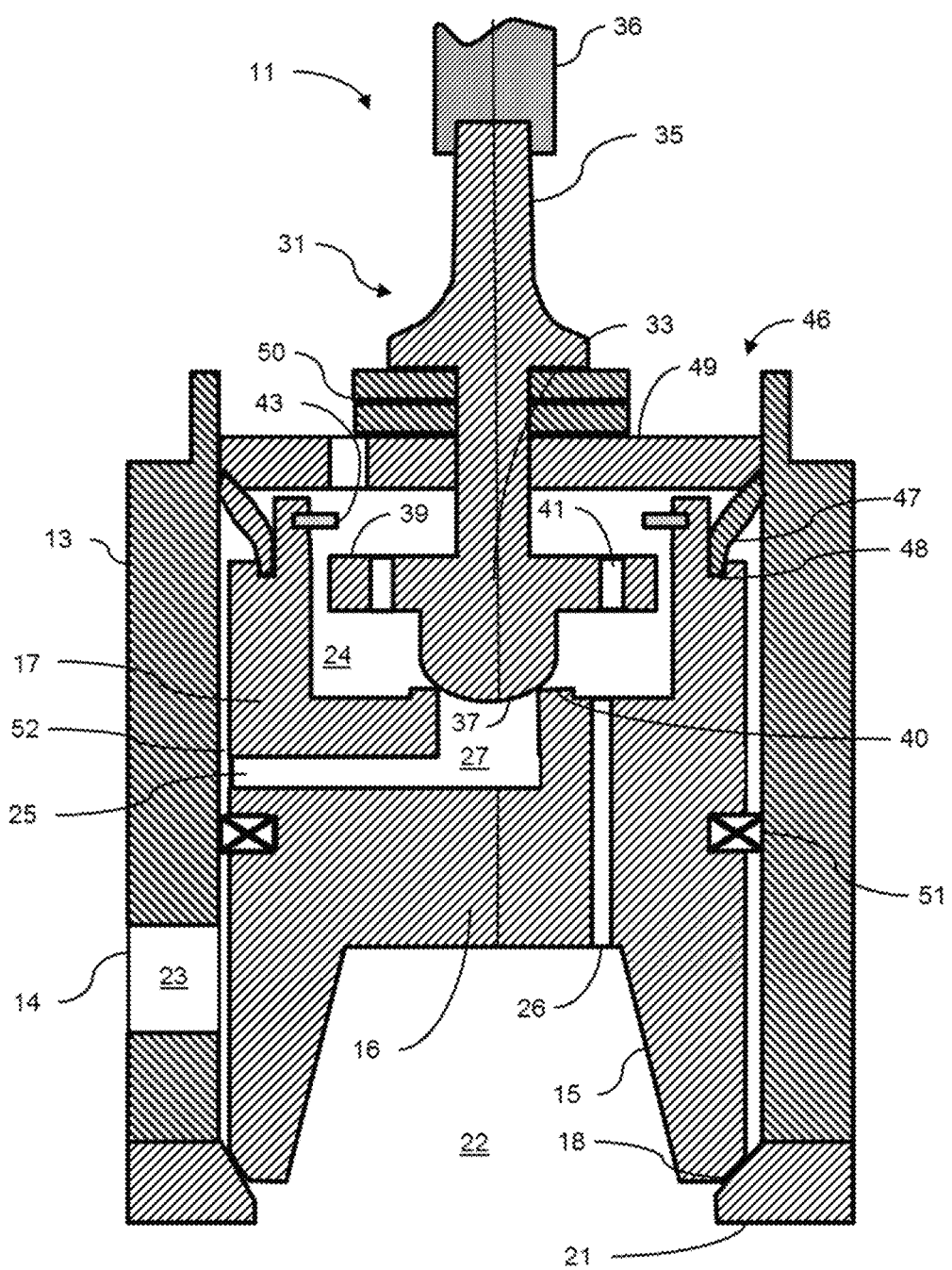
FIG. 3 is a schematic illustration (not to scale) of a cross section taken along the line A-A of FIG. 1 and shows embodiments of the valve trim in the closed position.

FIG. 3 is a cross section view taken along the line in FIG. 2 that is labeled A-A and illustrates the trim assembly 11 that may be integrated into a control valve (not shown). Note that dimensions and relationships are shown merely schematically and not to scale, and the relative dimensions of the components are exaggerated for clarity of illustration. Typically, there is a tight fit and relative close tolerance between components. The trim assembly 11 includes a cage 13 having a cage port 14 through which fluid may flow when the trim assembly 11 is in an open position. The cage 13 may be in the shape of a hollow cylinder and the cage port 14 may be one of a variety of distinct aperture shapes through the cage 13 to allow fluid flow to the exterior of the cage 13. Disposed inside the cage 13 is a main plug 15 which may be a single component having a lower portion 16, an upper portion 17 and a main seating surface 18. Also disposed beneath the cage 13 is a seat ring 21. Seat ring 21 may be a ring shaped component and may be provided with a beveled internal surface that engages the main seating surface 18 of the main plug 15. Seat ring 21 and main seating surface 18 of the main plug 15 create a tight seal when trim assembly 11 is in the closed position.

Figure 4:
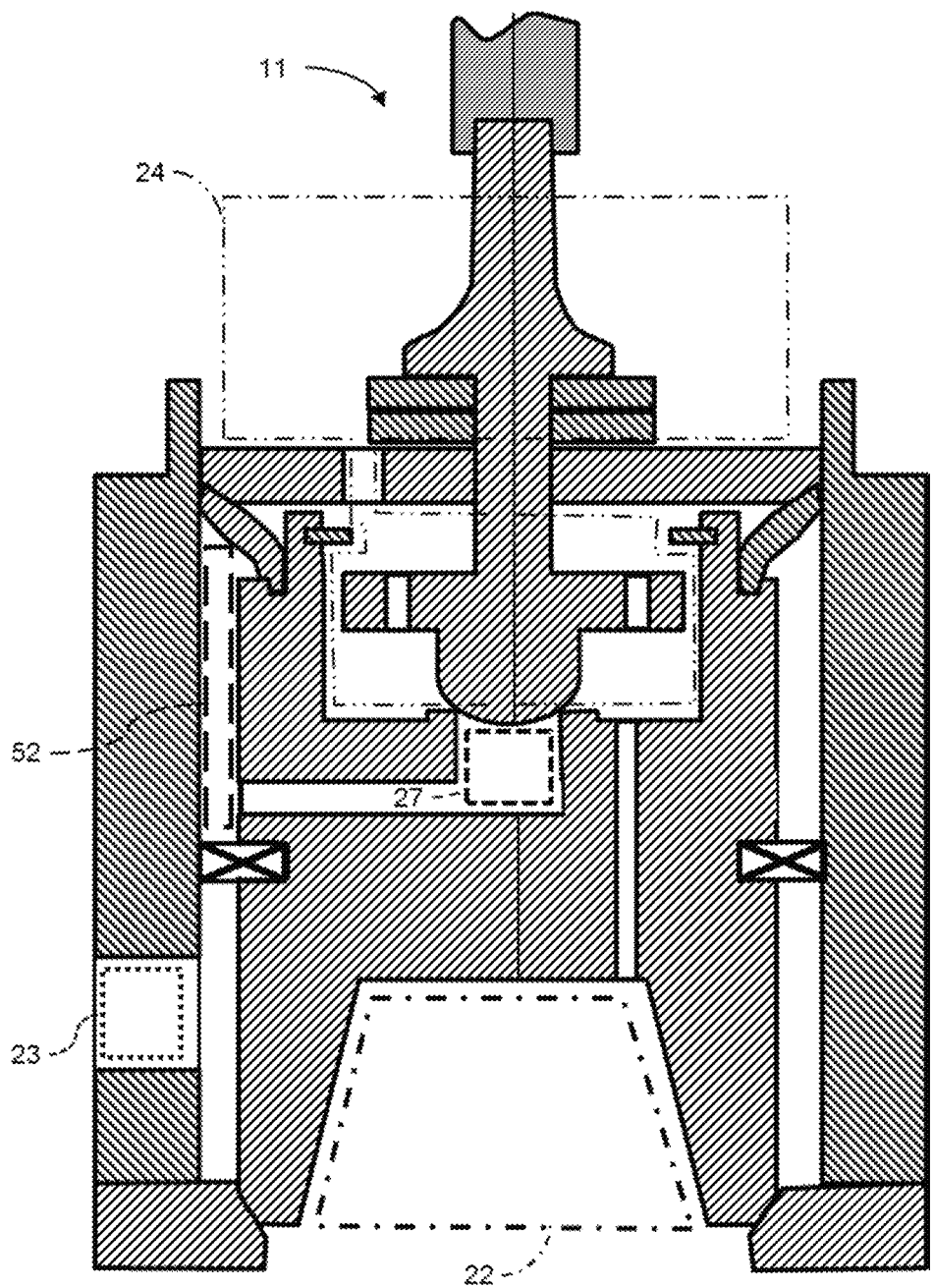
FIG. 4 is a schematic illustration (not to scale) of the cross section of an embodiment of the valve trim of FIG. 1 showing the relevant volumes and cavities.

FIG. 4 illustrates the trim assembly 11 of FIG. 3 illustrating the different volumes and cavities of the trim assembly 11. The relative spacing between components is exaggerated in comparison to FIG. 4, to illustrate the different volumes, chambers and cavities described. An upstream volume 22 (corresponding to the dashed line 22 in FIG. 4) is sealed from a downstream volume 23 (corresponding to the dashed line 23 in FIG. 4) by the tight seal created by the main plug 15 and the seat ring 21. The terms "downstream" and "upstream" are relative terms and the relative meaning may depend on whether the valve is a "flow to open" or a "flow to close" valve. As used herein the term "upstream" refers to the higher pressure region of the system.

In one embodiment the upper portion 17 of the main plug 15 includes a cavity 24 (corresponding to the dashed line 24 in FIG. 4). The cavity 24 may be considered part of the upstream volume 22. The main plug 15 may also be provided with one or more balancing conduit(s) 25 fluidly coupled to a pilot chamber 27 (corresponding to the dashed line 27 in FIG. 4). The main plug 15 is also provided with a longitudinal conduit 26 that provides fluid communication between the upstream volume 22 and the cavity 24.

The trim assembly 11 is provided with a pressure balancing assembly 31. In one embodiment, the pressure balancing assembly 31 includes a pilot plug 33 disposed inside the cavity 24. The pilot plug 33 may be one of a variety of shapes, including a bulbous shape as illustrated in FIG. 3, a cylinder with a beveled end surface or a conical shape, among others. The pressure balancing assembly 31 includes a pilot stem 35 connected to an actuator 36, a pilot sealing surface 37 and a pilot flange 39. The pilot sealing surface 37 is adapted to engage a pilot seat 40 on the main plug 15. The pilot flange 39 may be provided with one or more axial conduits 41 that are in fluid communication with cavity 24. A retaining ring 43 is coupled to the upper portion 17 of the main plug 15 and is adapted to engage the pilot flange 39 when the pilot plug 33 is raised.

Disposed adjacent to the upper portion 17 of the main plug 15 is seal assembly 46. Seal assembly 46 includes seal 47 that engages a first sealing surface 48 formed on the main plug 15. The sealing effectiveness of seal 47 increases as the pressure differential acting on the seal 47 (seal pressure) increases. Seal assembly 46 includes a load transfer assembly 49 and resilient member 50, such as a spring, that applies a force on the seal 47 to maintain the seal 47 in high friction contact with the cage 13 when the main plug 15 is in the closed position. The load transfer assembly 49 may be attached to the pilot stem 35 and is adapted to be displaced with the displacement of the pilot stem 35. The resilient member 50 may be a Belleville style washer.

One or more low friction flow restrictor 51 is disposed between the main plug 15 and the cage 13. The low friction flow restrictor 51 may be of a type selected from pressure energized polymeric rings, metal rings, a combination of TFE and resilient materials and a combination of metal and graphite, among others. The low friction flow restrictor 51 provide a relatively low friction seal and facilitate the pressurization of the pilot chamber 27 and seal balancing volume 52 in a regulated metered manner (i.e. controls the flow and prevents leakage).

The interior surface of the cage 13, the exterior surface of the main plug 15, the seal 47 and the low friction flow restrictor 51 define a seal balancing volume 52 (corresponding to the dashed lines 52 in FIG. 4). Seal balancing volume 52 is in fluid communication with balancing conduit 25 and the pilot chamber 27.

The various components of the trim assembly 11 may be manufactured using a variety of materials. The specific materials depend upon operating parameters such as fluid pressure and operating temperature, chemical characteristics of the fluid, cost, and piping system considerations. For example, corrosive fluid applications may require one or more of the cage 13, main plug 15, pilot plug 33, seat ring 21, and pilot stem 35 to be made from stainless steel or any other appropriate material (e.g., titanium, duplex stainless steels, or Nickel alloys).

Turning to the operation of the components of the trim assembly 11, FIG. 3 illustrates the trim assembly 11 in the closed position. The pressure balancing assembly 31 and the pilot plug 33 are also in the closed position. The main plug 15 seals the cage port 14 and the downstream volume 23 from the upstream volume 22. The upstream volume 22 is at an upstream pressure (P1) and the downstream volume 23 is at a downstream pressure (P2). The upstream pressure (P1) is higher than the downstream pressure (P2). The pilot plug 33 seals the pilot chamber 27 from the cavity 24. Seal 47 seals the seal balancing volume 52 from the cavity 24. When the main plug 15 is in the closed position the pressure in the cavity 24 will be maintained at the upstream pressure (P1) by means of longitudinal conduit 26 that fluidly couples the cavity 24 with upstream volume 22. The pressure in the seal balancing volume 52 is maintained at the downstream pressure (P2) because of the connection of the seal balancing volume 52 with the downstream volume 23. The low friction flow restrictor 51 allows sufficient flow so that the pressure in the seal balancing volume 52 is equalized with the pressure in the downstream volume 23 after sufficient time has passed. Seal 47 is maintained in contact with the cage by load transfer assembly 49. Seal 47 is forced against the cage 13 by the combination of the load from the load transfer assembly 49 and the pressure differential (the difference between the upstream pressure (P1) and the downstream pressure (P2)) acting on the seal 47, The pressure differential acting on the seal 47 increases the effectiveness of the seal. The seal assembly 46 provides a high friction seal when the main plug 15 is in the closed position.

Figure 5:
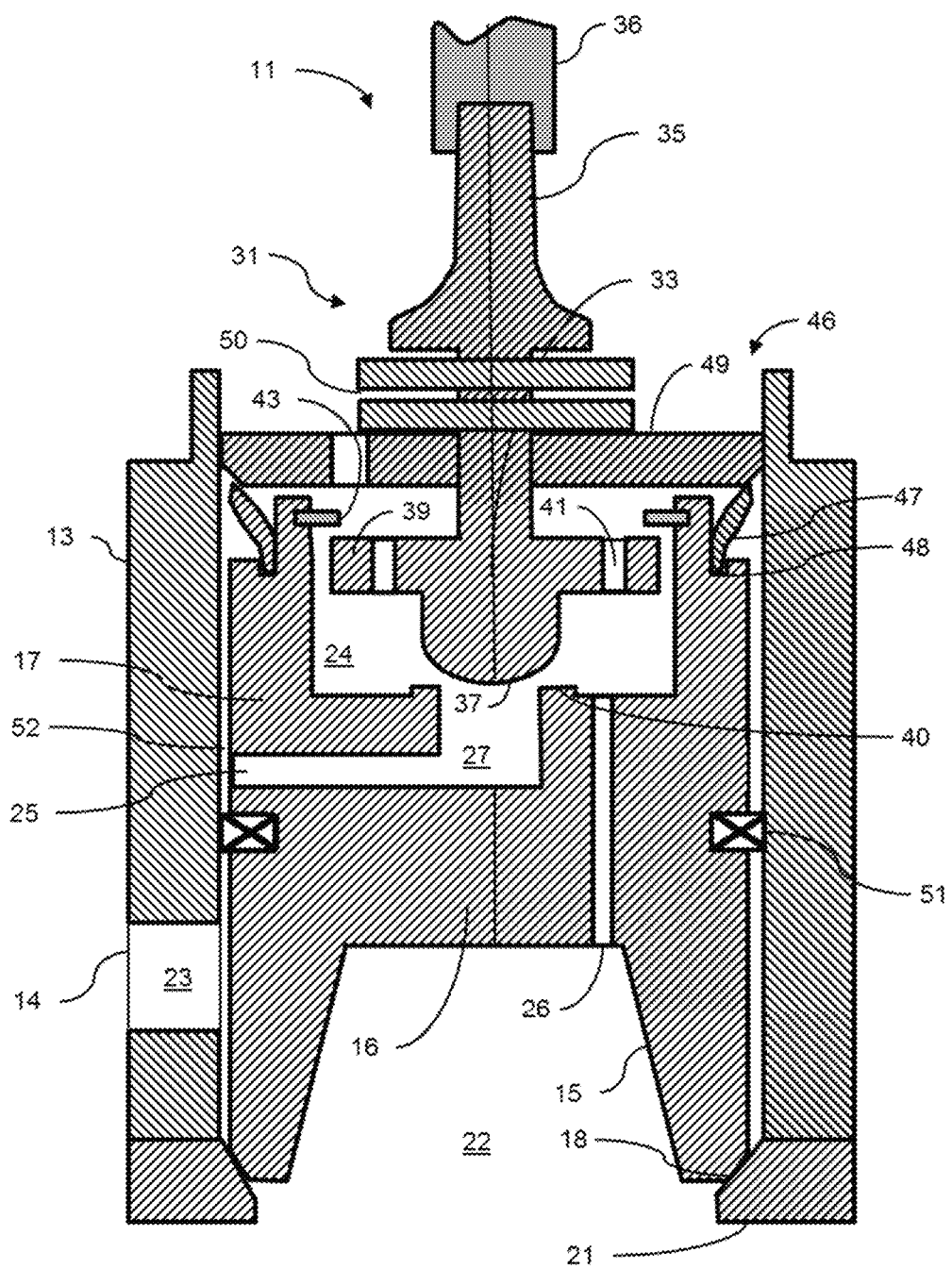
FIG. 5 is a schematic illustration (not to scale) of the cross section of an embodiment of the valve trim of FIG. 1 in the pressure balanced position.

FIG. 5 illustrates the trim assembly 11 of FIG. 3 with the pressure balancing assembly 31 in the pressure balanced position. The pilot plug 33 is displaced upwardly and is unseated from the pilot seat 40 (open pilot plug position) thereby exposing the pilot chamber 27 to fluid at the upstream pressure (P1). The low friction flow restrictor 51 restricts the fluid flow from the seal balancing volume 52 to the downstream volume 23 to a rate sufficiently lower than the rate at which fluid flows from the upstream volume 22 through balancing conduit 25 thereby pressurizing the seal balancing volume 52. The pressure in pilot chamber 27 and seal balancing volume 52 is consequently balanced with the pressure at the upstream volume 22 (P1). At this point, trim assembly 11 and the pilot plug 33 are in an overtravel position. An overtravel is any travel position of the actuator 36 and pilot stem 35 that does not move the main plug 15. As the pressure in the pilot chamber 27 is increased to the upstream pressure (P1) the pressure differential acting on seal 47 is reduced. Additionally, load transfer assembly 49 is displaced so that the load exerted on the seal 47 by load transfer assembly 49 is reduced or eliminated. The removal of the load and the balancing of the pressure reduce or eliminate the friction and contact of the seal 47 with the cage 13 before the main plug 15 is displaced thereby reducing the thrust requirements of the actuator 36. All other reference numbers in FIG. 5 have previously been described with reference to FIG. 3.

Although in this embodiment the main plug 15 travels upwardly when opened, other embodiments may be configured in a manner that the main plug 15 travels downwardly when opened. Additionally, the terms "upwardly" and "downwardly" are used with reference to the orientation of the Figures, and are not intended to be limiting in any way. As used in this disclosure "balanced" means that the pressure in the seal balancing volume 52 is increased so as to reduce the difference between the pressure of the fluid in cavity 24 and the pressure of the fluid in the seal balancing volume 52.

Figure 6:
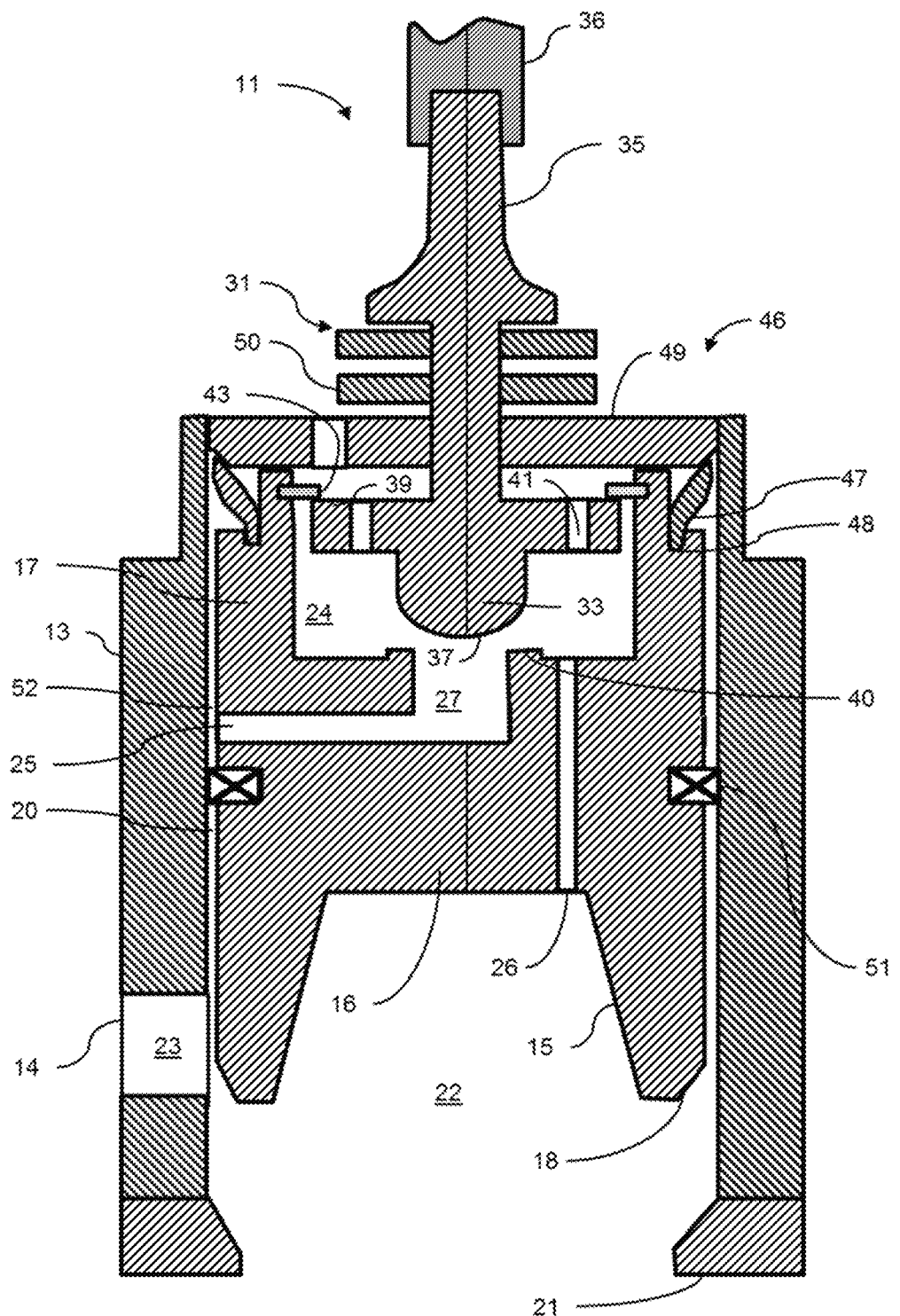
FIG. 6 is a schematic illustration (not to scale) of the cross section of an embodiment of the valve trim of FIG. 1 in the open position.

FIG. 6 illustrates the trim assembly 11 of FIG. 3 with the pressure balancing assembly 31 in the open position. In the open position, the pilot plug 33 is in a fully open position and the pilot flange 39 engages the retaining ring 43. The displacement of the pilot plug 33 will cause the main plug 15 to be displaced into the open position. Because the contact between seal 47 and cage 13 has been reduced or eliminated, the friction created by the displacement of the main plug 15 is significantly reduced. All other reference numbers in FIG. 5 have previously been described with reference to FIG. 3.

Figure 7:
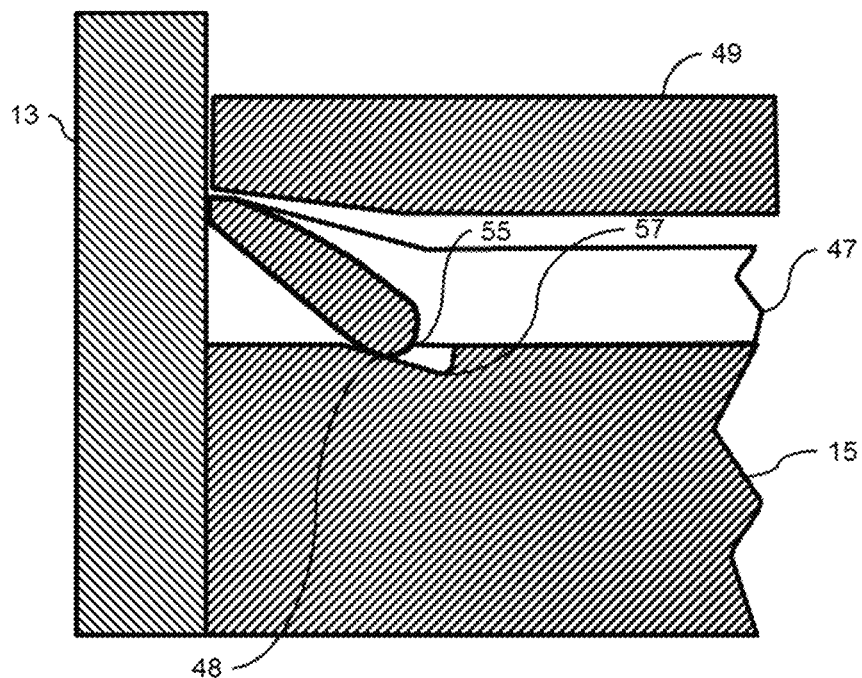
FIG. 7 is a schematic illustration (not to scale) of the cross section of an embodiment of a seal.
Figure 8:
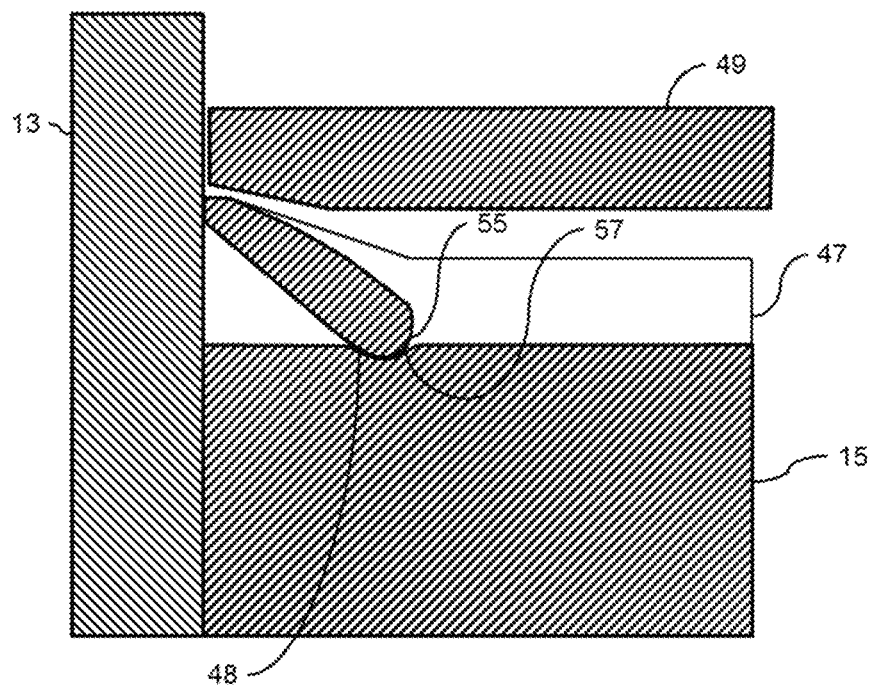
FIG. 8 is a schematic illustration (not to scale) of a cross section of an alternate embodiment of a seal.

FIGS. 7 and 8 illustrate further embodiments of the seal 47. In the embodiment of FIG. 7 the seal 47 may be a pressure energized twist seal that twists upon the application of a load or a pressure differential. The seal 47 may have the shape of a conical frustum of varying cross sectional thickness along the slant height. The seal 47 may be provided with a thicker midsection to minimize the body stresses to a desired level. The seal 47 is seated on the first sealing surface 48 on the main plug 15. The configuration of the first sealing surface 48 may vary, for example it may be straight, slanted or concave. The seal 47 may be made of metal having a high strength to elastic modulus ratio such as austenitic nickel-chromium-based superalloys that exhibit superior high temperature properties and creep life. The seal 47 is provided with sufficient resiliency, or stiffness, to relieve sealing contact with the cage 13 when the fluid pressure or load from the load transfer assembly 49 is reduced. The seal 47 may be provided with a bottom contour or gland 55 shaped to engage a detent surface 57 on the first sealing surface 48. The gland 55 and the detent surface 57 facilitate the sliding between seal 47 and the main plug 15 such that seal 47 can extend radially outward to close the predetermined clearance with the cage 13 under a smaller axial thrust from the actuator 36. For example, in the embodiment illustrated in FIG. 7, the detent surface 57 is wedge shaped and adapted to engage a gland 55 that is convex in shape. In the embodiment illustrated in FIG. 8 a detent surface 57 that is concave in shape is adapted to engage the gland 55 that is convex in shape to provide an adequate seal.

The bottom portion of the seal 47 also ensures that the contact pressure generated at the contact between seal 47 and plug remains at an optimum level so as to block any secondary leakage pathways and at the same time minimize any excessive plastic deformation of the seal 47.

Figure 9:
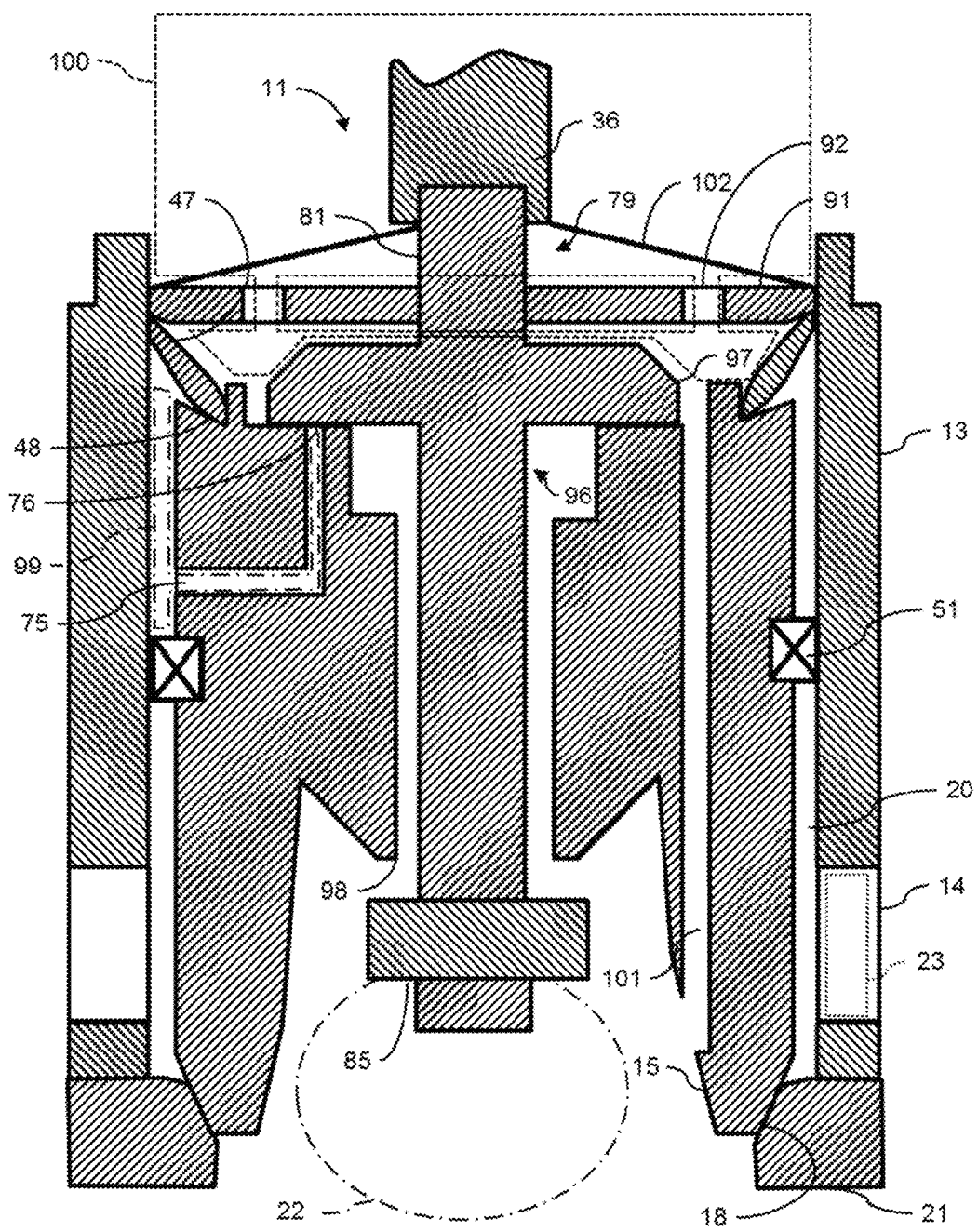
FIG. 9 is a schematic illustration (not to scale) of a cross section of an alternate embodiment of a valve trim in a closed position.

Illustrated in FIG. 9 is a second embodiment of a trim assembly 11. The trim assembly 11 includes a cage 13 having a cage port 14, and a main plug 15 disposed within the cage 13. The main plug 15 may be shaped like an annular tube and is configured to slide within the cage 13.

The main plug 15 is provided with a main seating surface 18 that engages a seat ring 21 disposed below the cage 13. The main plug 15 includes a balancing conduit 75 having an opening 76. The main plug 15 may also be provided with a plug platform 98 at the bottom of the main plug 15.

The trim assembly 11 is provided with a seal 47—a high friction twist seal—disposed on a first sealing surface 48 formed in the main plug 15. Seal 47 is forced against the cage 13 by two mechanisms, the load transfer assembly 91 and the pressure differential acting on the seal 47. One or more passages 92 may be formed in the load transfer assembly 91. As increasing pressure is applied to the seal 47, it deforms and continues to seal against the seal surfaces with higher internal stress and contact pressure. The trim assembly 11 is also provided with a low friction flow restrictor 51. The interior of the cage 13, the exterior of the main plug 15 together with the seal 47 and the low friction flow restrictor 51 define a seal balancing volume 99 (corresponding to dashed line 99 in FIG. 9). The balancing conduit 75 is fluidly coupled to the seal balancing volume 99. Disposed below the main plug 15 is an upstream volume 22 (corresponding to dashed line 22 in FIG. 9) at an upstream pressure (P1), and disposed above the main plug 15 is a pressurizing volume 100 (corresponding to a dashed line 100 in FIG. 9). The pressurizing volume 100 is also maintained at the upstream pressure (P1) by means of longitudinal conduit 101 coupling the pressurizing volume 100 with upstream volume 22. The upstream volume 22 and the pressurizing volume 100 may be considered a single volume at upstream pressure (P1). The terms "above" and "below" are used to refer to relative locations of identified elements with reference to the drawings and are not intended to denote the orientation of the components of the trim assembly 11 in actual use.

The trim assembly 11 also includes a stem assembly 79 having a stem 81 in the shape of an elongated rod. The trim assembly 11 also includes a nut 85 having a diameter larger than the diameter of the stem 81, and a pressure balancing assembly 96 including a sealing flange 97 also having a diameter larger than the diameter of the stem 81. The pressure balancing assembly 96 is movable between a closed position, an overtravel position and an open position. The stem assembly 79 may be biased with a resilient member 50 that engages the sealing flange 97. The stem assembly 79 may be coupled to an actuator 36 that drives the stem assembly 79 and causes the stem assembly 79 to slide within the cage 13. The load transfer assembly 91 may be biased with resilient member 102 such as for example a Belleville washer.

FIG. 9 shows an embodiment of the trim assembly 11 with the pressure balancing assembly 96 and the main plug 15 in the closed position. The load transfer assembly 91 is in contact with the seal 47, forcing the seal 47 into contact with the cage 13. In the closed position, upstream volume 22 is maintained at the upstream pressure (P1), and the cage port 14 is maintained at a downstream pressure (P2). The main seating surface 18 of the main plug 15 is seated against the seat ring 21 forming a tight seal. The main plug 15 is forced against the seat ring 21 by the actuator 36. The sealing flange 97 seals the balancing conduit 75. The seal 47 and the low friction flow restrictor 51 seal off the seal balancing volume 99 that is maintained at the downstream pressure (P2). The low friction flow restrictor 51 permits a limited flow of fluid so that the pressure of the seal balancing volume 99 is substantially the same as the downstream pressure (P2) of the fluid at the cage port 14. Pressurizing volume 100 is in fluid communication with the upstream volume 22 through longitudinal conduit 101, thereby maintaining the pressure in the pressurizing volume 100 at the upstream pressure (P1). When the main plug 15 is in the closed position, the sealing flange 97 covers the opening 76 and the pressure differential between the pressure in the seal balancing volume 99 (P2) and the pressure in pressurizing volume 100 (P1) keeps the seal 47 fully pressurized and in a tight sealing relationship with the cage 13. The pressurizing volume 100, the seal balancing volume 99, the balancing conduit 75 and the sealing flange 97 perform as a pressure balancing assembly when the stem 81 is displaced.

Figure 10:
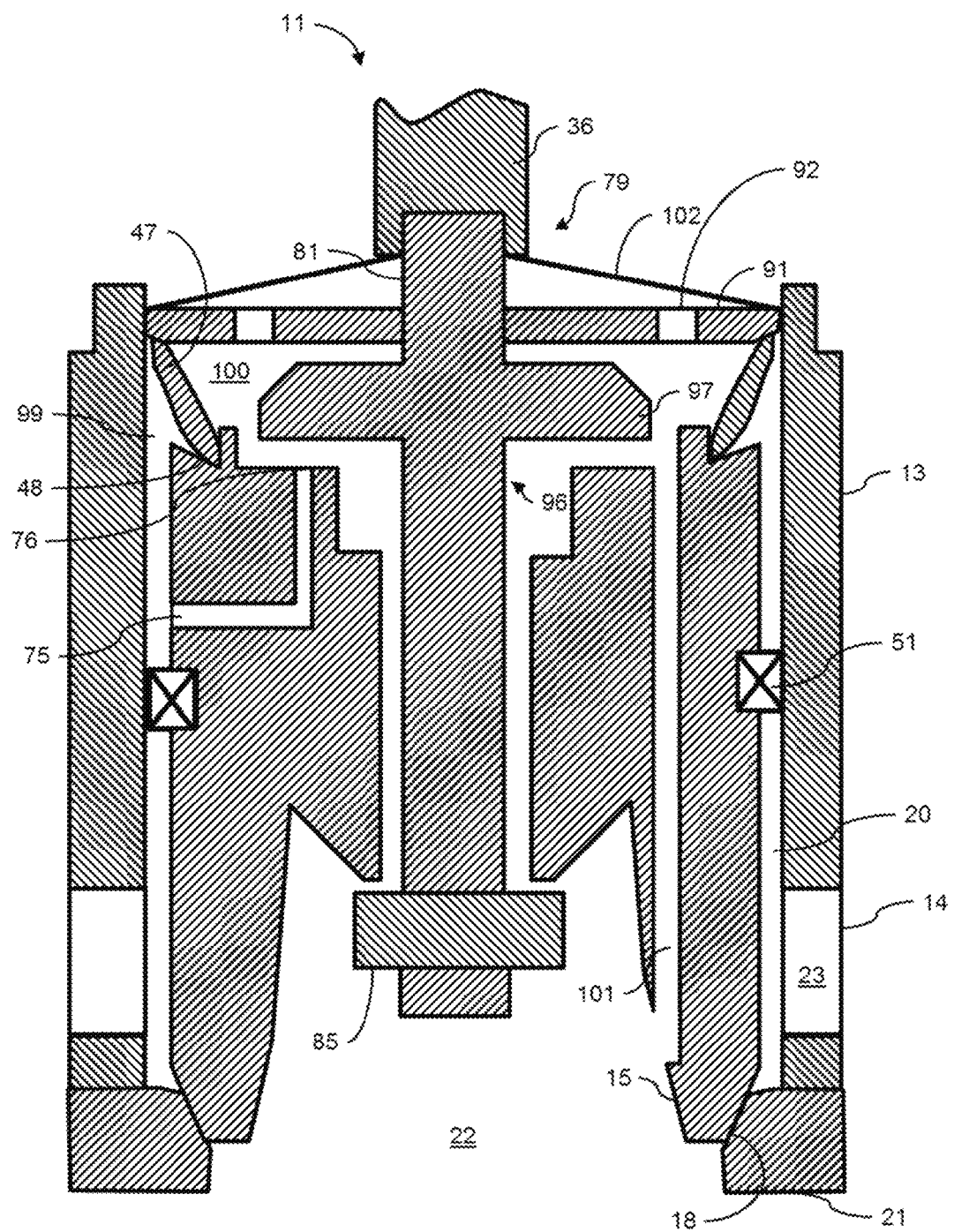
FIG. 10 is a schematic illustration (not to scale) of a cross section of the alternate embodiment of the valve trim of FIG. 8 in a pressure balanced position.

FIG. 10 shows the trim assembly 11 of FIG. 9 with the pressure balancing assembly 96 in an overtravel position and the main plug 15 in a pressure balancing position. In this position, the stem assembly 79 has been displaced a sufficient distance for the sealing flange 97 to be displaced, thereby uncovering the balancing conduit 75. The seal balancing volume 99 is then fluidly coupled with the pressurizing volume 100 that is at upstream pressure P1. Leakage of the fluid through low friction flow restrictor 51 is less than the inflow to the seal balancing volume 99 so that, after an interval of time, the pressure in the seal balancing volume 99 is increased to the upstream pressure thereby reducing or eliminating the pressure differential acting on the seal 47. The result is that the pressure exerted against the cage 13 by the seal 47 is significantly reduced or the contact between the seal 47 and the cage 13 is eliminated before any movement of the main plug 15. All other reference numbers in FIG. 10 have previously been described with reference to FIG. 9.

Figure 11:
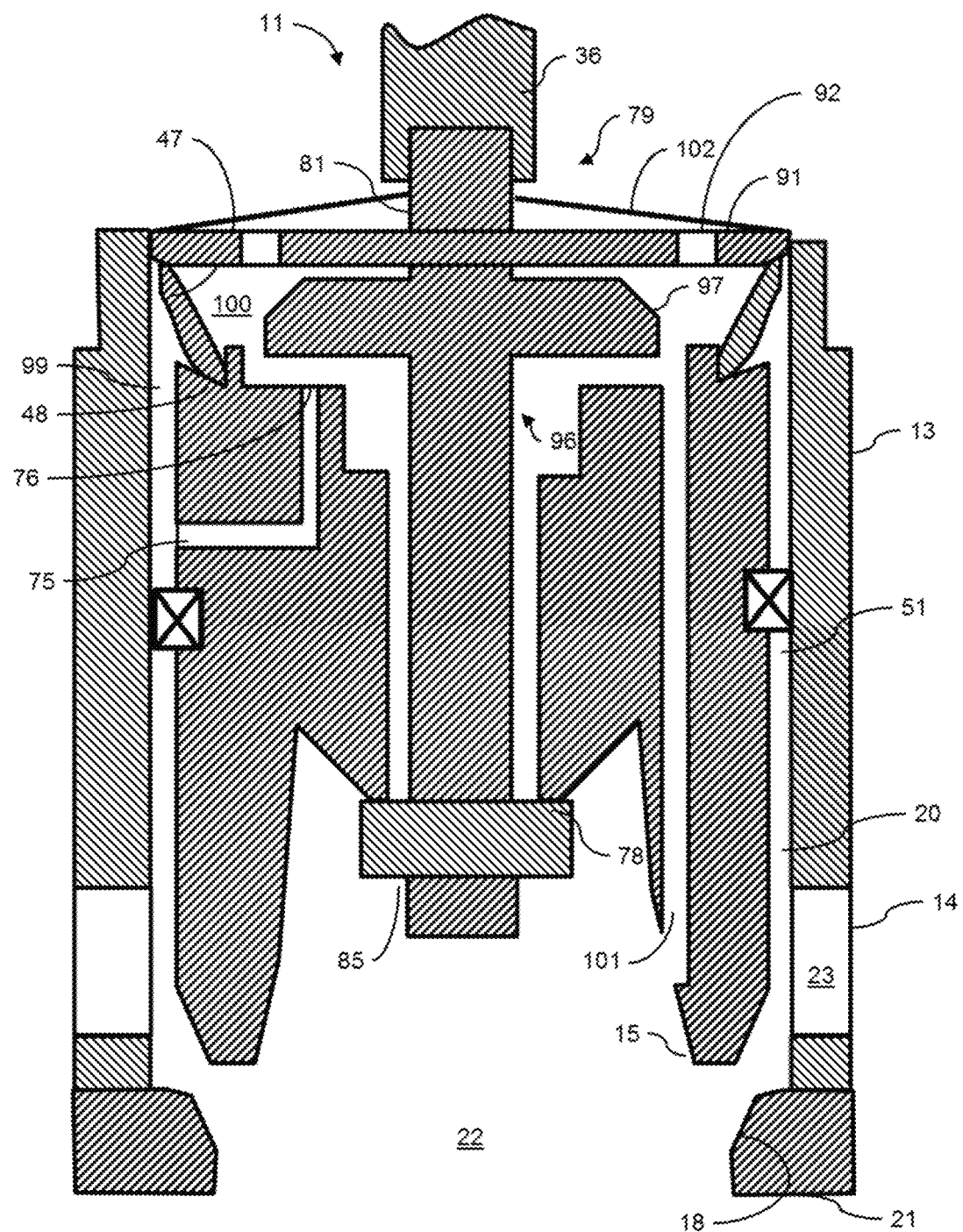
FIG. 11 is a schematic illustration (not to scale) of a cross section of the alternate embodiment of the valve trim of FIG. 8 in an open position.

FIG. 11 shows the trim assembly 11 of FIG. 9 with the pressure balancing assembly 96 in an open position and the main plug 15 in an open throttling position. The stem assembly 79 is displaced upwardly and the nut 85 engages the bottom of the main plug 15. The pressure acting on the seal 47 has been balanced thereby reducing or eliminating the contact of the seal 47 with the cage 13. The friction between the seal 47 and the cage 13 is consequently reduced. The reduction in friction reduces the thrust required by the actuator 36 to displace the main plug 15. All other reference numbers in FIG. 11 have previously been described with reference to FIG. 9.

Although only two examples of assemblies for balancing the pressure across the seal 47 have been described (pressure balancing assembly 31 in FIG. 2-4 and the stem assembly 79 in FIGS. 9-11) it would be apparent to one of ordinary skill in the art to provide equivalent mechanisms for balancing the load without departing from the spirit of the invention. Similarly other arrangements that reduce the force on the seal 47 when the pressure on the seal 47 is balanced are contemplated, as may be apparent to one having ordinary skill in the art.

Figure 12:
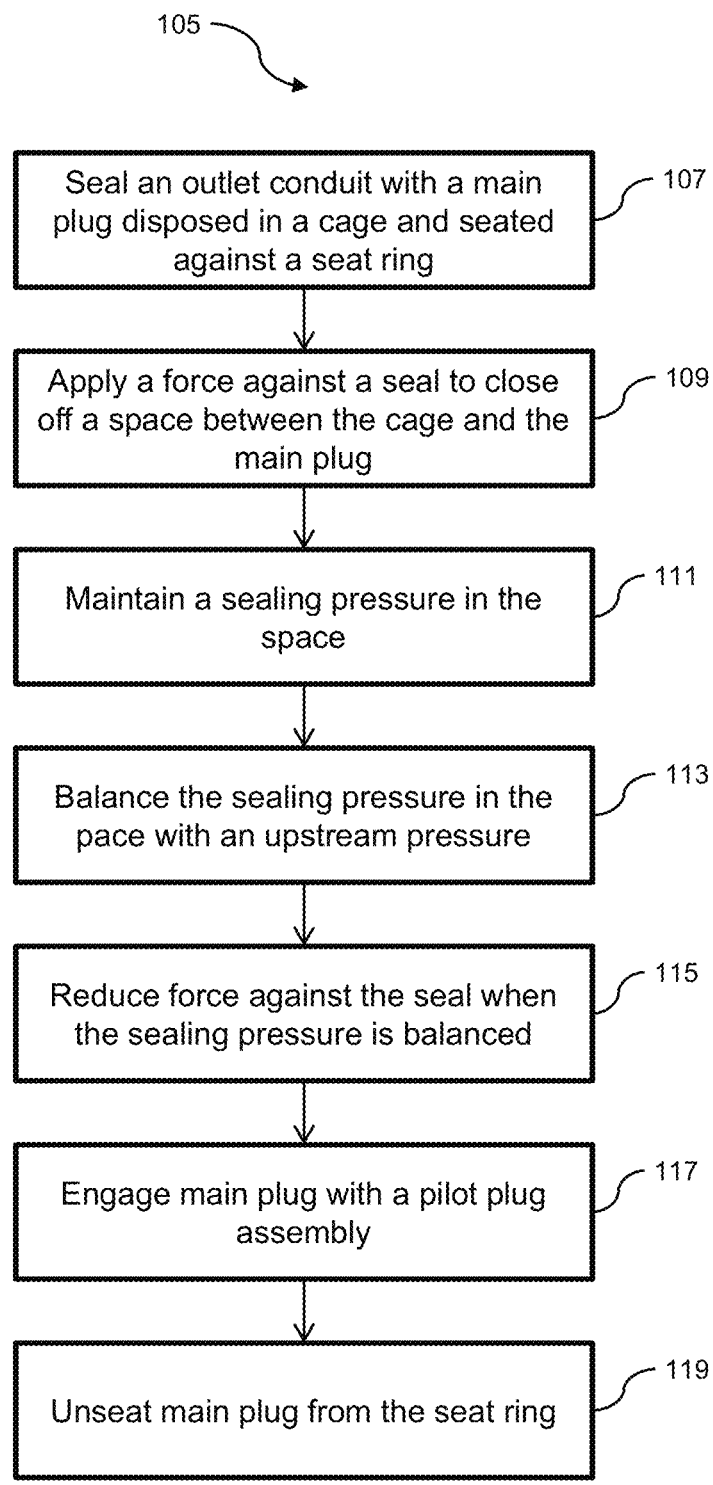
FIG. 12 is a flow chart of a method for controlling fluid flow.

FIG. 12 illustrates a method 105, implemented by embodiments of the trim assembly 11, for controlling fluid flow through the operation of a trim assembly 11.

Referring to FIGS. 2, 4, 5, 8, 9, 10, and 11, as indicated by box 107 the trim assembly 11 seals an upstream volume 22 with a main plug 15 disposed in a cage 13, the main plug 15 being seated against a seat ring 21.

As indicated by box 109 axial overtravel occurs and the trim assembly 11 applies a force against a seal 47 to close off the seal balancing volume 52 between the main plug 15 and the cage 13 and provide for a tight seal between the upstream pressure P1 and the downstream pressure (P2), when the main plug 15 is seated against the seat ring 21. In this step, the force may be applied by a load transfer assembly 49.

As indicated by box 111 the trim assembly 11 maintains an upper portion of the main plug 15 at a sealing pressure P1. This may be accomplished by the pressure balancing assembly 31 illustrated in FIG. 2, when the pilot sealing surface 37 is seated on the pilot seat 40 thereby generating a differential pressure across the seal 47. Alternately this may be accomplished by the sealing flange 97 in FIG. 9 covering the opening 76.

As indicated by box 113 the trim assembly 11 balances the pressure across the seal 47. This is accomplished by displacement of the pressure balancing assembly 31 illustrated in FIG. 2 or displacement of the sealing flange 97 in FIG. 8.

As indicated by box 115 the trim assembly 11 reduces the force against the seal 47. This may be accomplished through an actuator 36 that engages a load transfer assembly 49.

As indicated by box 117 the pressure balancing assembly 31 engages the main plug 15.

As indicated by box 119 the trim assembly 11 unseats the main plug 15 from the seat ring 21.

Although method steps may be described in a sequential order, such methods may be configured to work in alternate orders. In other words, any sequence or order of steps that may be described in this patent application does not, in and of itself, indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Where the definition of terms departs from the commonly used meaning of the term, applicant intends to utilize the definitions provided herein.

The terminology used herein is for the purpose of describing particular embodiments only and is not intended to be limiting of the invention. Where the definition of terms departs from the commonly used meaning of the term, applicant intends to utilize the definitions provided herein, unless specifically indicated. The singular forms "a," "an,", and "the" are intended to include the plural forms as well, unless the context clearly indicates otherwise. It will be understood that, although the terms first, second, etc. may be used to describe various elements, these elements should not be limited by these terms. These terms are only used to distinguish one element from another. The term "and/or" includes any, and all, combinations of one or more of the associated listed items.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements.

What is claimed:

1. An apparatus, comprising:
    a cage;
    a main plug disposed in the cage and movable between a main plug closed position and a main plug open position;
    a seal assembly having a seal that is forced into high friction contact with the cage and maintains a pressure differential across the seal when the main plug is in the main plug closed position;
    a load transfer assembly comprising a first member movable relative to the seal, wherein the first member is configured to contact the seal in the main plug closed position; and
    a pressure balancing assembly movable between a closed position, an overtravel position, and an open position, wherein the pressure balancing assembly is configured to balance the pressure differential across the seal and to reduce friction between the seal and the cage when the pressure balancing assembly is in the overtravel position.

2. The apparatus of claim 1, further comprising a resilient member, wherein the resilient member is configured to exert a force on the first member, and wherein the first member is configured to transfer the force to the seal when the main plug is in the main plug closed position and to reduce the force on the seal when the pressure balancing assembly is in the overtravel position.

3. The apparatus of claim 1, further comprising:
    a pressurizing volume; and
    a seal balancing volume,
    wherein the pressure balancing assembly comprises a pilot plug adapted to couple the pressurizing volume to the seal balancing volume when the pressure balancing assembly is in the overtravel position.

4. The apparatus of claim 3, further comprising:
a conduit fluidly coupled with the seal balancing volume, wherein the pressure balancing assembly comprises a sealing member adapted to seal the conduit when the main plug is in the main closed position.

5. The apparatus of claim 4, wherein the sealing member comprises a flange coupled to the stem, wherein the stem is adapted to seal the conduit when the main plug is in the main plug closed position and to unseal the conduit when the main plug is in the main plug open position.

6. The apparatus of claim 4, wherein the sealing member comprises a pilot plug movable between the closed position, the overtravel position, and the open position.

7. The apparatus of claim 6, further comprising:
a flange coupled to the pilot plug; and
a retaining ring coupled to the main plug and configured to engage the flange when the pilot plug is in the open position.

8. The apparatus of claim 1, wherein the seal is a pressure energized seal.

9. A method for controlling fluid flow through a valve trim, comprising:
forcing a seal into contact with a cage with a load;
maintaining a pressure differential across the seal;
displacing a first member of a load transfer assembly from contact with the seal to release the seal from contact with the cage;
balancing the pressure differential across the seal; and
unseating a main plug when the pressure differential is balanced.

10. The method of claim 9, wherein balancing the pressure differential comprises,
displacing a pressure balancing assembly disposed inside a cavity formed in a main plug, the pressure balancing assembly configured to seal a pilot chamber in communication with an inlet port.

11. The method of claim 10, wherein unseating the main plug comprises,
engaging the main plug with the pressure balancing assembly to displace the main plug when the pressure differential is balanced and contact between the seal and the cage has been minimized or eliminated.

12. The method of claim 9, wherein forcing comprises, forcing the seal against the cage with a load transfer assembly.

13. The method of claim 9, further comprising: reducing the load on the seal when the pressure differential is balanced.

14. The method of claim 10, wherein the pressure balancing assembly is movable between a closed position, an overtravel position, and an open position, and wherein unseating the main plug comprises,
engaging the main plug with the pressure balancing assembly when the pressure balancing assembly is in the open position.

15. A system for controlling fluid flow through a valve trim, comprising:
a cage;
a main plug disposed in the cage and moveable between a first position and a second position;
a seat ring configured to engage the main plug in the first position;
a seal member disposed about the main plug and in contact with the cage in the first position;
a load transfer assembly comprising a first member movable relative to the seal, wherein the first member is configured to contact the seal in the first position to transfer a force against the seal to maintain a pressure differential across the seal when the main plug is seated against the seat ring in the first position;
a pressure balancing assembly that balances the pressure differential with an upstream pressure before any movement of the main plug; and
a subsystem that unseats the main plug from the seat ring.

16. The system of claim 15, further comprising:
a pressurizing volume; and
a seal balancing volume,
wherein the pressure balancing assembly comprises a pilot plug that couples the pressurizing volume to the seal balancing volume when the load transfer assembly is in an overtravel position.

17. The system of claim 16, further comprising:
a flow restrictor circumscribing the main plug and disposed between the main plug and the cage,
wherein the pressurizing volume is defined by an exterior surface of the main plug, an interior surface of the cage, the seal, and the flow restrictor.

18. The system of claim 16, further comprising:
a stem; and
a conduit fluidly coupled with the seal balancing volume,
wherein the pressure balancing assembly comprises a sealing member disposed on the stem and adapted to seal the conduit when the main plug is in a closed position.

19. The system of claim 16, wherein the seal is a pressure energized seal.

20. The system of claim 16, wherein the pilot plug is movable between a closed position, an overtravel position, and an open position, and wherein the subsystem that unseats the main plug from the seat ring comprises a component that engages the main plug with the pressure balancing assembly when the pressure balancing assembly is in the overtravel position.

* * * * *